(12) United States Patent
Sakuma et al.

(10) Patent No.: US 6,460,331 B2
(45) Date of Patent: Oct. 8, 2002

(54) TORQUE CONVERTER

(75) Inventors: Shinji Sakuma; Takashi Nakamura; Takaki Yamaoka, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/729,688

(22) Filed: Dec. 6, 2000

(65) Prior Publication Data

US 2001/0003246 A1 Jun. 14, 2001

(30) Foreign Application Priority Data

Dec. 8, 1999 (JP) .......................................... 11-348380

(51) Int. Cl.[7] .............................................. F16D 33/00
(52) U.S. Cl. ........................................... 60/362; 60/365
(58) Field of Search ........................ 60/330, 357, 358, 60/362, 365; 192/3.3, 3.28

(56) References Cited

U.S. PATENT DOCUMENTS 4,271,939 A * 6/1981 Iwanaga et al. ............. 192/3.3
5,013,287 A * 5/1991 Hayakawa et al. ........... 475/61

* cited by examiner

Primary Examiner—Edward K. Look
Assistant Examiner—Thomas E. Lazo
(74) Attorney, Agent, or Firm—Armstrong, Westerman & Hattori, LLP

(57) ABSTRACT

An oil passageway 102 for suppling oil to a torque converter 30 having a pump impeller, a turbine runner and a stator 33, or removing it therefrom is formed between the shaft member 41 of a stator shaft 40 and the boss portion 42a of its flange member 42 and extends along a transmission input shaft 20, while a pump impeller boss member 31a has an outer periphery supported facing the pump impeller boss member 31a and situated closer to the stator 33 than that portion of the pump impeller boss member 31a which is supported by the bearing and the oil passageway 102 has its openings 40b and 40c situated closer to the stator 33 than that portion of the pump impeller boss member 31a which is supported by the bearing.

3 Claims, 3 Drawing Sheets

TORQUE CONVERTER

FIELD OF THE INVENTION

This invention relates to a torque converter for transmitting the power of an engine to a transmission or gearbox by means of oil, and more particularly, to an arrangement of oil passageways through which oil is supplied into a torque converter, or removed from it.

BACKGROUND OF THE INVENTION

A known torque converter is shown in FIG. 3 of the accompanying drawings. It has a pump impeller 201, a turbine runner 202 and a stator 203. The pump impeller 201 is connected with a converter cover 204 to the output shaft of an engine not shown, and the turbine runner 202 is connected to the input shaft 206 of a transmission or gearbox by a turbine runner hub 205. The stator 203 is connected to a stator shaft 210 by a one-way clutch 207. The stator shaft 210 has a shaft member 211 situated about the input shaft 206 and a flange member 212 having a boss portion 212a press fitted about the shaft member 211 and a flange portion 212b attached to a transmission casing C. A pump impeller boss member 201a, which is attached to the pump impeller 201, is situated about the boss portion 212a, and is rotatably supported/by a bearing 208 located between the pump impeller boss member 201a and the shaft member 211.

Oil is supplied into the torque converter through a path formed by an oil passageway 221 in the flange portion 212b, to an oil passageway 222 between the shaft member 211 of the stator shaft 210 and the boss portion 212a of the flange member 212, to an opening 222a in the boss portion 212a, to a clearance around the bearing 208, to a space 223 between the pump impeller boss member 201a and the shaft member 211. The oil is discharged from the torque converter through a path formed by a space 224 between the turbine runner hub 205 and the one-way clutch 207, to an oil passageway 225 between the input shaft 206 and the shaft member 211, an oil passageway 226 in the shaft member 211 and an oil passageway 227 between the shaft member 211 and the boss portion 212a of the flange member 212.

In a conventional oil passage of this type the bearing 208, however, causes an increased resistance to the flow of oil. Moreover, the bearing 208 prevents the boss portion 212a of the flange member 212 from having its left end extended near the stator 203, and as the oil passageway 227 formed between the shaft member 211 and the boss portion 212a extends only to a position slightly short of the bearing 208, the oil passageway 225 between the input shaft 206 and the shaft member 211 must be extended to near the left end of the oil passageway 227. The oil passageway 225 is formed by a portion of the input shaft 206 having a smaller radius than the remaining portion, and thereby lowers the input shaft's strength and rigidity.

Moreover, the oil passageway 223 between the shaft member 211 and the pump impeller boss member 201a has a reduced diameter in its portion where it is supported by the bearing 208, the bearing 208 not having a smaller thickness to be less expensive. Its portion having a reduced diameter gives an increased resistance to the flow of oil, but there is no alternative but to use it as an oil passageway, since the boss portion 212a of the flange member 212 is not allowed to have its left end extended beyond the vicinity of the bearing 208, as stated before. The boss portion 212a is so small in length that there is hardly any freedom of forming the opening 222a in any other position along the boss portion 212a. While it may be possible to have the boss portion 212a extend in the opposite direction away from the torque converter, the transmission becomes undesirably large in overall length.

SUMMARY OF THE INVENTION

Under these circumstances, it is an object of this invention to provide a structure defining an improved arrangement of oil passageways in a torque converter and enabling a transmission to have an input shaft of improved strength and rigidity.

This invention is an attempt to solve the above problems. Besides improving the flow of oil to and from the torque converter, it is our purpose to provide a torque converter oil passageway with a structure that improves the strength and rigidity of the input shaft.

This object is attained by a structure comprising a torque converter having a pump impeller, a turbine runner and a stator, a transmission having an input shaft connected to the turbine runner and supported rotatably by a transmission casing, having about the transmission input shaft connected to the stator an inner cylindrical portion connected to the stator and situated about the input shaft (such as a shaft member 41) and an outer cylindrical portion press fitted about the inner cylindrical portion and connected to the transmission casing (such as boss portion 42a of flange member 42), and having a plurality of oil passageways (such as an oil passageway 102) formed between the outer periphery of its inner cylindrical portion and the inner periphery of its outer cylindrical portion and along the input shaft for supplying oil into the torque converter and removing it therefrom, and a pump impeller boss member connected to the pump impeller, situated about the outer cylindrical portion of the stator shaft and having an outer periphery supported rotatably by a bearing in the casing, the outer cylindrical portion of the stator shaft having an end situated closer to the stator than that portion of the pump impeller boss member which is supported by the bearing, and the oil passageways having at least one outlet opening (such as an opening 40b or 40c) situated closer to the stator than that portion of the pump impeller boss member which is supported by the bearing.

No bearing is required between the pump impeller boss member and the inner cylindrical portion of the stator shaft, since the former has its outer periphery supported by a bearing. As a result, the outer cylindrical portion of the stator shaft may have an end extended close to the stator and the oil passageways formed between the inner and outer cylindrical portions of the stator shaft may have at least one outlet opening situated close to the stator.

The torque converter has an improved arrangement of oil passageways enabling an efficient supply or removal of oil, since there is no bearing giving an increased resistance to the flow of oil. An oil passageway 111 formed between and along the transmission input shaft and the inner cylindrical portion of the stator shaft is smaller in length. As that passageway is formed by a portion of the input shaft having a reduced radius, its reduction in length improves the strength and rigidity of the input shaft. As the outer cylindrical portion of the stator shaft has its end situated close to the stator, there is a greater degree of freedom in determining the arrangement of oil passageways.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE PREFERRED EMBODIMENTS

Figure 1:
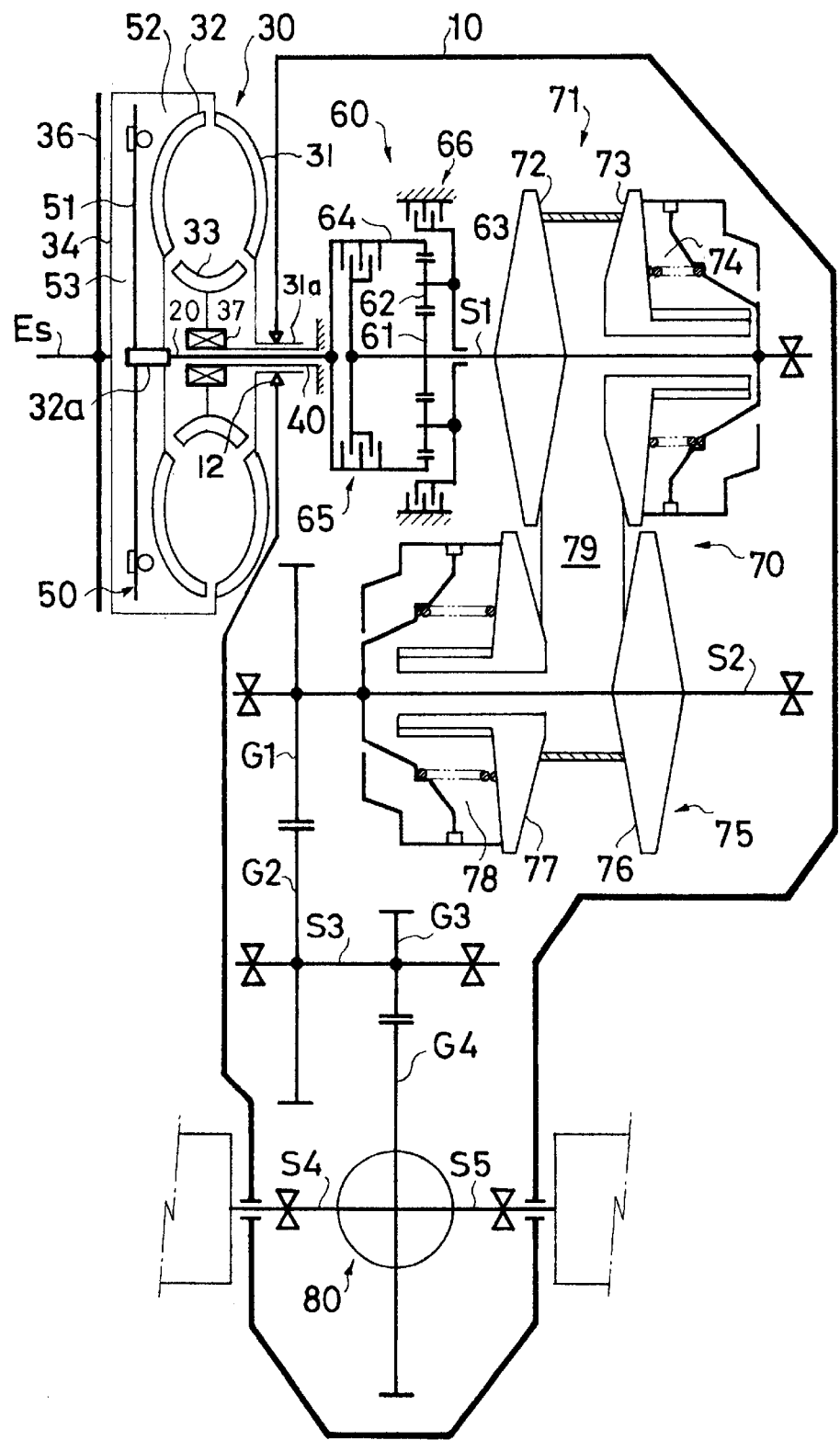
FIG. 1 is a schematic diagram of a transmission including a torque converter having an arrangement of oil passageways embodying this invention.
Figure 2:
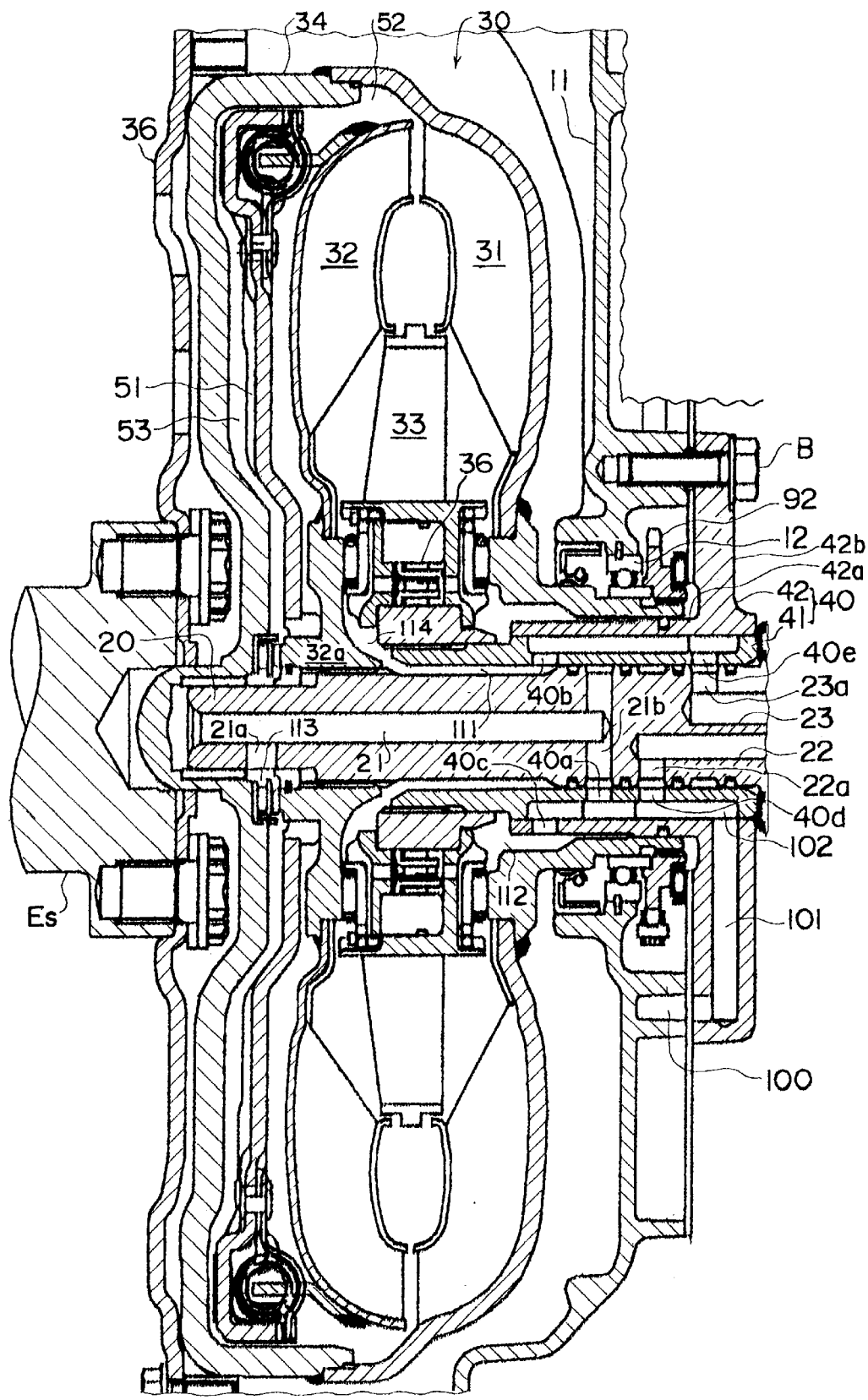
FIG. 2 is an enlarged sectional view of the torque converter shown in FIG. 1.
Figure 3:
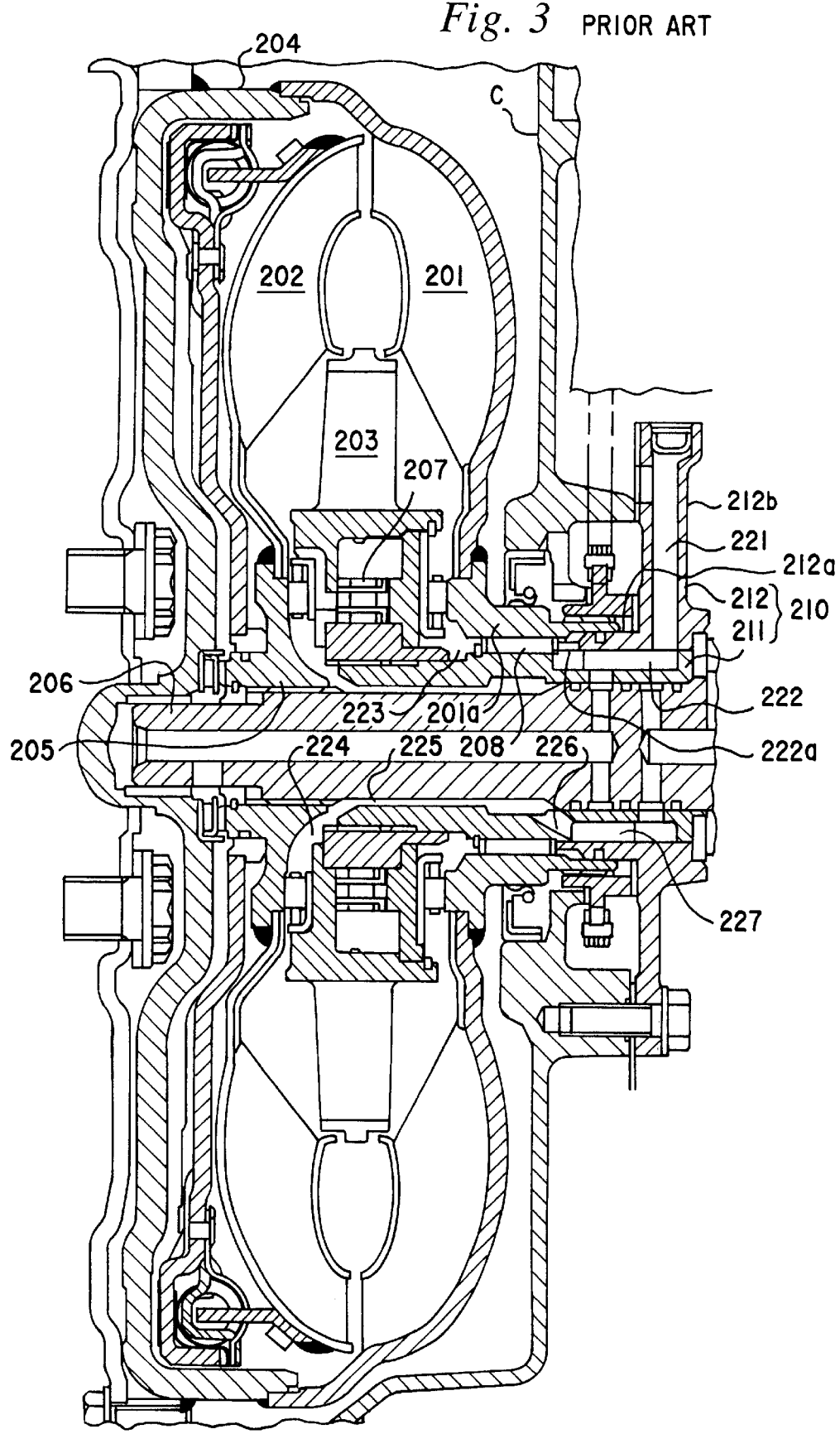
FIG. 3 is a view similar to FIG. 2, but showing a known torque converter.

Reference is made to FIG. 1 showing an automatic transmission for a motor vehicle including a torque converter having an improved arrangement of oil passageways embodying this invention, and FIG. 2 showing the torque converter in detail.

The transmission is housed in a transmission casing 10 and has an input shaft 20, a primary shaft S1, a secondary shaft S2, a counter shaft S3 and a pair of axles S4 and S5 which are rotatably supported by bearings attached to the casing 10. The primary shaft S1 is coaxial with the input shaft 20, and the secondary shaft S2 lies in a spaced apart and parallel to the input shaft 20 (or primary shaft S1). The counter shaft S3 lies in a spaced apart and parallel to the secondary shaft S2, and the axles S4 and S5 are coaxial with each other and lie in a spaced apart and parallel relation to the counter shaft S3.

The input shaft 20 receives power from an engine not shown through a torque converter 30. The torque converter 30 has a pump impeller 31, a turbine runner 32 and a stator 33. The pump impeller 31 forms an integral part of a converter cover 34 connected to an engine crankshaft Es by a drive plate 36 carrying a starter gear. The turbine runner 32 is connected to the input shaft 20 by a turbine runner hub 32a and the stator 33 is connected to a stator shaft 40 by a one-way clutch 37. The stator shaft 40 has a shaft member 41 (inner cylindrical portion) situated about the input shaft 20 and to which the stator 33 is connected by the one-way clutch 37, and a flange member 42 having a boss portion 42a (outer cylindrical portion) press fitted about the shaft member 41 and a flange portion 42b formed at the right-hand end of the boss portion 42a, as shown in FIG. 2. The flange portion 42b is bolted at B to a partition 11 in the transmission casing 10.

The pump impeller 31 is connected to the left-hand end of a pump impeller boss member 31a situated about the boss portion 42a of the flange member 42 and having an outer periphery supported rotatably by a bearing 12 attached to the partition 11. Thus, the input shaft 20, stator shaft 40 and pump impeller boss member 31a are coaxial with one another. The pump impeller boss member 31a carries at its right-hand end a pump drive gear 92 connected by a chain with a pump driven gear carried on the rotor shaft of an oil pump not shown. Thus, the rotation of the engine is transmitted to the pump impeller 31 and the pump impeller boss member 31a and thereby the chain to drive the oil pump. The oil leaving the oil pump is supplied throughout the transmission by a plurality of passageways.

The torque converter 30 has a lock-up mechanism 50 including a lock-up clutch piston 51 attached to the turbine runner hub 32a with the inner surface of the converter cover 34 to enable the power of the engine to be directly transmitted to the input shaft 20. The lock-up clutch piston 51 is moved by the oil flowing into or out of two oil chambers into which a space in the torque converter 30 is divided by the lock-up clutch 51, i.e., the oil chamber 52 formed on the turbine side between the turbine runner 32 and the lock-up clutch piston 51 and the oil chamber 53 on the cover side between the converter cover 34 and the lock-up clutch piston 51. This invention is embodied in an arrangement of oil passageways extending to and from the oil chambers 52 and 53 as will be described later with the operation of the lock-up mechanism 50.

The power is transmitted from the input shaft 20 to the primary shaft S1 by a forward and backward switchover mechanism 60. The mechanism 60 has a sun gear 61 secured to the primary shaft S1, a plurality of pinion gears 62 meshing with the sun gear 61, a carrier 63 rotatable about the primary shaft S1 and supporting the pinion gears 62 rotatably and a ring gear 64 secured to the input shaft 20 and meshing with the pinion gears 62. The ring gear 64 is engageable with the primary shaft S1 if a forward clutch 65 is operated hydraulically, and the carrier 63 is engageable with the transmission casing 10 if a backward brake 66 is operated hydraulically.

If the forward clutch 65 is engaged, while the backward brake 66 is released, the input shaft 20, ring gear 64, pinion gears 62, sun gear 61, and carrier 63 are rotated together and the primary shaft S1 is rotated in the same direction as the input shaft 20. If the forward clutch 65 is released, while the backward brake 66 is engaged, the rotation of the input shaft 20 is transmitted to the sun gear 61 through the pinion gears 62 having their axes of rotation fixed by the carrier 63, and the primary shaft S1 is rotated in the opposite direction to the input shaft 20.

The rotation of the primary shaft S1 is transmitted to the secondary shaft S2 by a belt type stepless speed changing mechanism 70 composed of a drive pulley 71 on the primary shaft S1, a driven pulley 75 on the secondary shaft S2 and a metallic V-belt 79 extending between the pulleys 71 and 75.

The drive pulley 71 has a fixed half 72 fixed to the primary shaft S1 and a movable half 73 facing the fixed half 72 and supported on the primary shaft S slidably along it. The movable half 73 is movable by a hydraulic cylinder 74 to or away from the fixed half 72, so that the distance between the fixed and movable halves 72 and 73, or the pulley width may be variable. The driven pulley 75 has a fixed half 76 fixed to the secondary shaft S2 and a movable half 77 facing the fixed half 76 and supported on the secondary shaft S2 slidably along it. The movable half 77 is moved by a hydraulic cylinder 78 through intake or discharge of oil to or away from the fixed half 76, so that the distance between the fixed and movable halves 76 and 77, or the pulley width may be variable. If the widths of the pulleys 71 and 75 are altered, it is possible to vary the radius of the V-belt 79 wound about the pulleys to thereby achieve a stepless variation of the speed change ratio between the primary and secondary shafts S1 and S2.

The power is transmitted from the secondary shaft S2 to the a counter shaft S3 through gears G1 and G2, and to a differential mechanism 80 through a final drive gear G3 and a final driven gear G4. The power is distributed by the differential mechanism 80 to the front axles S4 and S5 to drive the front wheels carried on their ends, respectively.

While the power transmitted from the engine to the input shaft 20 through the torque converter 30 is transmitted to the front wheels through the forward and backward switchover mechanism 60 and the belt type stepless speed changing mechanism 70 to enable the vehicle to run, the stepless speed changing mechanism 70 makes it possible to obtain a desired speed change ratio in a stepless way. The forward and backward switchover mechanism 60 is used for changing the direction in which the vehicle runs.

Description will now be made of the arrangement of oil passageways embodying this invention and the operation of the lock-up mechanism 50.

The input shaft 20 has a first to a third oil passageway 21 to 23, as shown in FIG. 2. The first oil passageway 21 is used for supplying oil to the oil chamber 53 on the cover side of the torque converter 30 or removing oil therefrom, and has openings 21a and 21b near its opposite ends, respectively. The second and third oil passageways 22 and 23 are used for supplying oil to the forward and backward switchover mechanism 60 and the belt type stepless speed changing mechanism 70 or removing oil therefrom, and has openings 22a and 23a, respectively.

The stator shaft 40 has five radially extending oil passageways 101a to 101e formed in its flange portion 42b, though they are shown merely as 101 in FIG. 2. It also has five oil passageways 102a to 102e formed between the outer periphery of its shaft member 41 and the inner periphery of the boss portion 42a of its flange member 42 and connected with the oil passageways 101a to 101e, though they are shown merely as 102 in FIG. 2. The shaft member 41 has openings 40a, 40b, 40d and 40e 3 defining the outlets of the oil passageways 102a, 102b, 102d and 102e, respectively, and the boss portion 42a of the flange member 42 has an opening 40c defining the outlet of the oil passageway 102c. The opening 40a connects the oil passageway 102a with the opening 21b of the first oil passageway 21 and the opening 40b connects the oil passageway 102b with an oil space 111 formed between the input shaft 20 and the shaft member 41. The opening 40c connects the oil passageway 102c with a space 112 formed between the stator shaft 40 and the pump impeller boss member 31a and the opening 40d connects the oil passageway 102d with the opening 22a of the second oil passageway 22. The opening 40e connects the oil passageway 102e with the opening 23a of the third oil passageway 23.

The transmission includes a hydraulic control system for detecting the vehicle speed and controlling the operation of hydraulic valves and the supply of oil to the oil chamber 52 on the turbine side and the oil chamber 53 on the cover side for lock-up purposes. If the vehicle speed which has been detected by a vehicle speed detector not shown is lower than a predetermined level, no lock-up control is made, but if it is higher, lock-up control is made.

When no lock-up is made, oil having a specified pressure is supplied into the transmission case 10 through an oil supply port 100, and flows into the oil chamber 53 on the cover side through the oil passageways 101a and 102a, openings 40a and 21b, first oil passageway 21, its opening 21a and a space 113 formed between the input shaft 20 and the turbine runner hub 32a. The oil flows from the oil chamber 53 into the torque converter 30, so that the pressure in the oil chamber 52 on the turbine side (i.e., the internal pressure of the converter) becomes equal to the pressure in the oil chamber 53 on the cover side (i.e., the back pressure of the converter). Thus there is no pressure difference between the two oil chambers 52 and 53, and the lock-up clutch piston 51 stays away from the converter cover 34. If oil is supplied into the torque converter 30 as stated, the oil leaving it is discharged into an oil reservoir not shown through a space 114 formed between the turbine runner hub 32a and the one-way clutch 36, oil space 111, opening 40b, oil passageway 102b and oil passageway 101b, or possibly through the space 112, opening 40c, oil passageway 102c, oil passageway 101c and an oil cooler not shown.

When lock-up is made, the oil supplied through the oil supply port 100 and having an appropriate pressure flows into the oil chamber 52 on the turbine side through the oil passageways 101c and 102c, opening 40c and space 112, while oil is discharged from the oil chamber 53 on the cover side into the oil reservoir through the space 113, opening 21a, second oil passageway 21, opening 21b, opening 40a, oil passageway 102a and oil passageway 101a. As a result, the pressure in the oil chamber 52 (the internal pressure of the converter) becomes higher than the pressure in the oil chamber 53 (the back pressure of the converter) and the lock-up clutch piston 51 is engaged with the converter cover 34. The oil leaving the torque converter 30 is discharged into the oil reservoir through the space 114, oil space 111, opening 40b, oil passageway 102b, oil passageway 10b, a torque converter check valve not shown, and oil cooler.

Whether lock-up is made or not, the oil which has been supplied through the oil supply port 100 also flows into the second oil passageway 22 through the oil passageways 110d and 102d, opening 40d and opening 22a, and into the third oil passageway 23 through the oil passageways 101e and 102e, opening 40e and opening 23a. The oil which has been supplied into the second and third oil passageways 22 and 23 is used for controlling the forward and backward switchover mechanism 60 and the belt type stepless speed changing mechanism 70, as stated before.

Through this oil hydraulic control system, oil enters the converter 30 which enables operational control of the lock up clutch 51. Also as the pump impeller boss member 31a has its outer periphery supported by the bearing 12, no bearing is required any longer between it and the shaft member 41. Therefore, the boss portion 42a of the flange member 42 has its end facing the inner periphery of the pump impeller boss member 31a and extends closer to the stator 33 than that portion of the pump impeller boss member 31a which is supported by the bearing 12, and the oil passageway 102 formed between the shaft member 41 of the stator shaft 40 and the boss portion 42a of its flange member 42 is so extended as to have its outlet openings 40b and 40c situated closer to the stator 33 than that portion of the pump impeller boss member 3 1a which is supported by the bearing 12.

As there is no longer any bearing giving an increased resistance to the flow of oil, the torque converter 30 can be supplied with oil more efficiently than ever, and the space 111 formed between the input shaft 20 and the shaft member 41 for discharging oil can be reduced in length. As the space 111 is formed by a portion of the input shaft 20 having a reduced radius, its reduction in length improves the strength and rigidity of the input shaft 20. The pump impeller boss member 31a has no portion of reduced diameter defining an oil passageway so that there is no reduction in the flow of oil, and as the boss portion 42a of the flange member 42 has its end situated closer to the stator 33, there is a greater degree of freedom in the arrangement of oil passageways.

While the invention has been shown and described by way of its preferred embodiment, it is to be understood that variations or modifications may be easily made by those skilled in the art without departing from the scope of this invention which is defined by the appended claims. Referring to a few possible modifications, this invention is equally applicable to a torque converter having no lock-up clutch piston as described, and a torque converter combined with a planetary transmission enabling switchover between a plurality of steps of forward movement and backward movement instead of the forward and backward switchover, and belt type stepless speed changing mechanisms as described.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No. 11-348380 filed on Dec. 8, 1999, which is incorporated herein by reference.

What is claimed is:

1. A structure defining an arrangement of oil passageways in a torque converter having a pump impeller, a turbine runner and a stators said structure comprising:

a transmission having an input shaft connected to said turbine runner and supported rotatably by a casing;

a stator shaft situated about said input shaft and having a plurality of oil passageways formed along it for supplying oil into said torque converter and removing it therefrom; and a pump impeller boss member connected to said pump impeller and situated about said stator shaft and having an outer periphery supported rotatably by a bearing-on said transmission casing;

said stator shaft including an inner cylindrical portion situated about said input shaft and an outer cylindrical portion mounted on said inner cylindrical portion and connected to said casing, said oil passageways being formed between the outer periphery of said inner cylindrical portion and the inner periphery of said outer cylindrical portion.

2. A structure defining an arrangement of oil passageways in a torque converter having a pump impeller, a turbine runner and a stator, said structure comprising:

a transmission having an input shaft connected to said turbine runner and supported rotatably by a casing; a stator shaft situated about said input shaft and having a plurality of oil passageways formed along it for supplying oil into said torque converter and removing it therefrom; and a pump impeller boss member connected to said pump impeller and situated about said stator so and having an outer periphery supported rotatably by a bearing on said transmission casing;

said stator shaft having an end situated closer to said stator than that portion of said pump impeller boss member which is supported by said bearing, and said oil passageways having at least one outlet opening situated closer to said stator than said portion of said pump impeller boss member supported by said bearing;

wherein said stator shaft has an inner cylindrical portion situated about said input shaft and an outer cylindrical portion press fitted about said inner cylindrical portion and connected to said casing, said oil passageways being formed between the outer periphery of said inner cylindrical portion and the inner periphery of said outer cylindrical portion.

3. The structure as set forth in claim 1, wherein at least one of said oil passageways communicates with passageways formed in said input shaft through holes formed in said inner cylindrical portion.

* * * * *